(12) United States Patent
Koehler-Guenther (10) Patent No.: US 8,039,032 B2
(45) Date of Patent: Oct. 18, 2011

(54) METHOD FOR PROCESSING OVULATED EGGS OF AQUATIC ANIMALS INTO DELICACY FOODS

(75) Inventor: Angela Koehler-Guenther, Bremerhaven (DE)

(73) Assignee: Stiftung Alfred-Wegener-Institut Fuer Polar-und Meeresforschung, Bremerhaven (DE)

( * ) Notice: Subject to any disclaimer, the term of this patent is extended or adjusted under 35 U.S.C. 154(b) by 648 days.

(21) Appl. No.: 12/083,805

(22) PCT Filed: Oct. 18, 2006

(86) PCT No.: PCT/DE2006/001867
§ 371 (c)(1),
(2), (4) Date: Apr. 18, 2008

(87) PCT Pub. No.: WO2007/045233
PCT Pub. Date: Apr. 26, 2007

(65) Prior Publication Data
US 2009/0246335 A1      Oct. 1, 2009

(30) Foreign Application Priority Data
Oct. 19, 2005   (DE) .......................... 10 2005 050 723

(51) Int. Cl.
*A23L 1/328* (2006.01)
(52) U.S. Cl. .......................... 426/300; 426/643; 426/519
(58) Field of Classification Search .................. 426/643, 426/300, 519
See application file for complete search history.

(56) References Cited

U.S. PATENT DOCUMENTS
5,389,657 A    2/1995    Madsen

FOREIGN PATENT DOCUMENTS
| JP | 60091934 | | 5/1985 |
| JP | 62-118868 | * | 5/1987 |
| RU | 2056759 C1 | | 3/1996 |
| RU | 2126218 | | 2/1999 |
| RU | 2179815 C2 | | 2/2002 |
| RU | 2232523 | | 3/2004 |
| RU | 2236159 | | 9/2004 |

OTHER PUBLICATIONS

Mizuno et al., "Elimination of adhesiveness in the eggs of shishamo smelt *Spirinchus lanceolatus* using kaolin treatment to achieve high hatching rate in environment with a high iron concentration", Aquaculture 242, 2004, Hokkaido Japan, pp. 713-726.
LaFleur et al.: "Sea urchin ovoperoxidase: oocyte specific member of a heme-dependent peroxidase superfamily that functions to block polyspermy", Mechanisms of Developments 70, 1998, Providence, RI, pp. 77-89.
Wessel et al.: "The Biology of Cortical Granules" Int. Rev. Cytol. 209, 2001, Providence, RI, pp. 1-96.
T.L. Deits et al, "Conformational Control of Ovoperoxidase Catalysis in the Sea Urchin fertilization Membrane", The Journal of Biological Chemistry, vol. 261, No. 26, Issue of Sep. 15, Washington 98195, pp. 12159-12165, 1986.
Ch.A. Foerder et al. "Release of ovoperoxidase from sea urchin eggs hardens the fertilization membrane with tyrosine crosslinks", Proc. Natl. Acad. Sci. vol. 74, No. 10, Washington 98195, pp. 4214-4218, Oct. 1977.
Kay E et al., "Assembly of the Fertilization Membrane of the Sea Urchin: Isolation of a Divalent Cation-Dependent Intermediate and its Crosslinking in Vitro", Cell, vol. 29, No. 3, Jul. 1982, Washington 98195, pp. 867-875, XP002422376.
International Search Report from PCT/DE2006/001867 mailed on Mar. 14, 2007.

* cited by examiner

*Primary Examiner* — Anthony Weier
(74) *Attorney, Agent, or Firm* — Leydig, Voit & Mayer, Ltd.

(57) ABSTRACT

A method for processing ovulated eggs of an aquatic animal into delicacy foods. Ovulated eggs are harvested without harmful intervention of the aquatic animal. The harvested ovulated eggs are exogenously treated in an aqueous solution by adding at least one signal transduction molecule. Accordingly the membrane of the egg is physiologically stabilized by ovoperoxidase activation. The signal transduction molecule is naturally occurring in the egg cell. The eggs are then preserved.

21 Claims, 7 Drawing Sheets

Prior art

METHOD FOR PROCESSING OVULATED EGGS OF AQUATIC ANIMALS INTO DELICACY FOODS

CROSS REFERENCE TO PRIOR RELATED APPLICATIONS

This is a U.S. National Phase application under 35 U.S.C. §371 of International Application No. PCT/DE2006/001867, filed on Oct. 18, 2006, and claims the benefit of German Patent Application No. 10 2005 050 723.9, filed on Oct. 19, 2005. The International Application was published in German on Apr. 26, 2007 as WO 2007/045233 A1 under PCT Article 221(2).

FIELD

The present invention relates to a method for processing the ovulated eggs of aquatic animals into delicacy foods having a harvest of the ovulated eggs without harmful intervention on the aquatic animal and a preservation, and to ovulated eggs of aquatic animals processed into delicacy foods using the method.

BACKGROUND

The processed, always unfertilized eggs of various aquatic animals have been praized for some time as a delicacy in wealthy society and are increasingly consumed. The not yet naturally laid, immature (in various stages) eggs of fish are referred to as roe. The roe may, theoretically, originate from any female fish (or aquatic animal), whose eggs are not toxic. This also includes the blowfish, fugu, which is highly toxic even with proper preparation. So-called "real caviar" or "Russian caviar" is produced from the roe of the sturgeon. One differentiates here between ossietra, beluga, and sevruga caviar. In addition to wild sturgeon farmed sturgeon have also already been used for obtaining caviar. The roe of lumpfish, cod-like fish, and herring is used for producing caviar substitute ("German caviar"). "Icelandic caviar" is produced from the roe of the capelin. Trout caviar is obtained from trout, and salmon caviar having a reddish color is produced from salmon. Furthermore, roe is also obtained from sea urchins. Finally, the amphibians, such as toads, which reproduce by laying eggs, are also to be included in the aquatic animals cited here. Roe is usually salted, sometimes also smoked. Smoked roe is produced from the roe located in the intact envelope by hot smoking. It typically originates from cod and pollack. The roe of lobster, large crayfish, and other crustaceans, as well as the orange-colored roe of scallops, is referred to as "corail".

Besides the high pleasure value, caviar also has other valuable properties. Caviar is rich in protein (25 to 30%), with a high proportion of essential amino acids. However, with 16% fat it is not a lean food. Caviar contains the vitamins D, E, $B_{12}$, and niacin, as well as the minerals iodine and sodium. In addition, it has a high proportion of good cholesterol.

The caviar currently available on the market is the treated (cleaned, salted) roe, which is taken in the immature state from the ovaries of female fish, because here the immature eggs have sufficient stability to further treatment steps. Thus, to obtain caviar of the best quality, until now the eggs have been harvested before they have reached their maximum maturity (ovulation stage).

A most significant problem in caviar production is obtaining the eggs. The problem of killing female animals to obtain caviar (e.g., sturgeon) exists both with wild capture and also in aquaculture (approximately 2500 tons/year worldwide). For centuries it has been a standard method to kill the animals before removing the eggs to obtain caviar and roe from various species of fish. A main argument for killing the female individuals is, for example in sturgeon, that the eggs are harvested in the immature state before reaching the natural ovulation stage, because the eggs which have ripened maximally in the body of the mother animal until ovulation, thus capable of being fertilized, are too soft. These mature eggs would burst upon preservation by salt (sodium chloride) alone and in combination with borax and stick together into an inedible slimy pulp. In the course of ovulation, i.e., the ejection of the egg from the follicles of the ovary, the egg undergoes natural changes (softening of the egg membrane for the imminent fertilization by sperm), which restrict its direct use as caviar. In addition, there are osmotic effects which occur later in the course of salting. Experiments using mildly salted sterlet caviar, which was produced for test purposes from ovulated (mature) and non-ovulated (immature) eggs, showed that the mature eggs burst already upon light contact and deliquesced into a greasy, pasty mass. However, significant taste differences were not detectable.

This practice of killing together with drastic overfishing has resulted in threatening of the wild stocks of the approximately 30 different species of sturgeon by extinction. In Russia, a new method has been developed by which immature roe may be obtained without killing the fish. A type of multiple "cesarean section" is performed on the ovaries under anesthetic, the immature eggs are pressed out, and the incisions are closed again. When these are healed, the fish may be released again or kept in breeding stations for later caviar removal. However, the mortality rate for this very complex method, which stresses the fish very strongly, is still above 40%. Moreover, this procedure is forbidden according to the German animal protection code.

Costly restocking programs have been initiated worldwide. Sturgeons are sexually mature in the natural environment for the first time at 8-12 years, in aquaculture earlier at 2-4 years depending on the type of sturgeon. Various species of sturgeon have been released from aquaculture into the wild within the frame of restoration programs with varying success, to save the stocks threatened by extinction. While the female animal remains alive for cultivation and the eggs are obtained by stripping, the problem of killing the female animals still exists for the above-mentioned reasons for caviar production in aquaculture.

High commercial losses are also to be considered for the cultivation of larvae and fingerlings for aquaculture and for stocking measures, however, because the females display significantly improved reproductive performance with increasing age.

Processing after the harvest is desired for the quality of the caviar. Mild salting makes it more storable. High-quality caviar is salted just enough as required for the limited storability. A caviar identified by "malossol" may have a salt content of at most 2.8 to 4%. The natural taste is largely retained in malossol caviar. In addition to malossol caviar, there is also salted caviar, storable for long time, which is mixed with approximately 10-12% cooking salt. Fresh caviar is very temperature-sensitive and thus difficult to store and serve. The traditional form of packaging is the airtight, internally coated can for only salted, but not heated caviar. Pasteurized caviar made storable by brief heating to 60° C. is sold in screwtop jars and ring-pull cans and is storable unopened for one year.

One problem in the storage of fresh caviar is the growth of existing bacteria, resulting in more rapid product spoilage.

However, upon pasteurization the caviar loses graininess and taste due to the heat treatment. A further problem in the storage of caviar and other roe products is the crystallization of tyrosine molecules, which are stored in the eggs as nonessential amino acids. The product becomes unsellable due to this crystallization. Furthermore, a problem also exists in the processing speed of the roe obtained. Up to this point, no more than 10 minutes may pass between the harvesting of the eggs from the female and the decanting of the caviar into cans, otherwise the eggs spoil.

However, it is very desirable during every step of the processing (preservation, pasteurization, inter alia) after the harvesting of the eggs that the harvested eggs survive without bursting, because bursting of the eggs results in an irreversible quality loss and thus uselessness of the product.

JP 60091934A describes a method for producing packed herring roe, in which the harvested herring roe, which was taken in the immature stage from the previously killed herring females, is treated antibacterially using a solution made of hydrogen peroxide and salt after a preservation using salt for roe solidification. The concentration of the hydrogen peroxide used may be reduced by immediate blood removal from the harvested herring roe, which results in a taste improvement of the herring roe. After the hydrogen peroxide-salt treatment, an enzymic treatment using catalase is performed to remove the oxyradical hydrogen peroxide. The immediate removal of the still uncoagulated blood may only occur directly after the killing of the fish or shortly before the thawing of the fish, which was frozen directly after killing. Because the immediate removal on the freshly killed fish may only be performed with great effort, however, the fish are typically first frozen, which in turn results in a loss of quality.

Furthermore, tannic acid is a proven agent in aquaculture in obtaining breeding fish. The fertilized eggs are treated using a tannic acid solution to remove the sticky gel layer. The eggs may thus be disinfected better during the breeding, and fungi and bacteria infestation during the egg incubation may be reduced. This treatment is standard for various species of fish such as sea bass, including sturgeon (Mizuno et al.: "Elimination of adhesiveness in the eggs of shishamo smelt *Spirinchus lanceolatus* using kaolin treatment to achieve high hatching rate in environment with a high iron concentration", Aquaculture 242 (2004) pp. 713-726). Tannic acid, a polyphenol, is the commercial form of tannin. Its structure is based on glucose esters of gallic acid. Tannic acid is used as a wood staining agent and is naturally present in oak, walnut, mahogany, and sequoia trees as a fire retardant. It may also be inferred from Mizuno et al. (FIG. 5) that a higher egg pressure up to bursting may be achieved by a treatment using tannic acid. However, the egg membrane toughens like rubber due to the treatment with tannic acid and is thus no longer suitable for consumption.

RU 2 126 218 C1 describes a method for dyeing, in which ovulated roe having a weak natural coloration, in particular also of "lower quality" species of fish than sturgeon, are dyed and salted in two steps at an interval of at least 0.5 hours. In the first step, ⅔ of the pigment is added directly to the roe, and in the second step the remaining component of the pigment is introduced together with a lipid-protein emulsion in a quantity of 5 to 10% in relation to the mass of the roe. The salting is performed before the second dyeing step. It may thus not be excluded in this method that the ovulated roe will burst during the following salting after the addition of the dye in the first step. The lipid-protein emulsion is applied after the salting and is used for stable dyeing and improving the organoleptic features and radiation protection properties of the roe.

RU 2 232 523 C2 describes a method for producing granular caviar from ovulated sturgeon roe. For this purpose, the harvested ovulated eggs are first treated in a hot 1.5-2% aqueous solution of a preservative, to prepare them for a following pasteurization at temperatures of 65-70° C. Apart from the fact that every heating procedure significantly influences the taste of the roe, when ovulated eggs are used, which are known to have a very soft egg membrane, it is not reliably ensured that they will endure the following treatment using preservatives without bursting. Even a small proportion of burst eggs worsens the quality of the caviar significantly, because the burst eggs may only be removed with difficulty. However, the fact that the animals neither have to be killed nor treated by stressful surgery for harvesting is of special advantage if ovulated eggs are used.

According to the above, it is thus currently assumed that full value caviar cannot be produced from mature (ovulated) sturgeon eggs, because naturally matured eggs are too soft as a result of the expected fertilization and burst immediately upon contact with salt or other preservatives. The methods discussed above for obtaining caviar from ovulated roe do not provide satisfactory results.

SUMMARY

In an embodiment, the present invention provides a method for processing ovulated eggs of an aquatic animal into delicacy foods. Ovulated eggs are harvested without harmful intervention of the aquatic animal. The harvested ovulated eggs are exogenously treated in an aqueous solution by adding at least one signal transduction molecule so as to physiologically stabilize the membrane of the egg by ovoperoxidase activation. The signal transduction molecule is naturally occurring in the egg cell. The eggs are then preserved.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Implementations of the method for processing the eggs of aquatic animals into delicacy foods according to exemplary embodiments of the present invention are explained in greater detail in the following with respect to the drawings, in which.

DETAILED DESCRIPTION

In an embodiment, the invention provides a method including processing the ovulated eggs harvested freshly from the living aquatic animal in such a way that they may be processed further without quality loss, in particular without bursting, into full value delicacy foods and thus achieve a marketable and competitive quality. In particular, a lower sensitivity of the eggs during the processing and significantly longer storability even without strong preservation methods are to be achieved by the method. Furthermore the method is to be applicable easily and cost-effectively and designed so that it is also detectable on the finished product, in addition.

Aspects of the present invention include:
harvesting the ovulated eggs without harmful intervention on the aquatic animal,
exogenous treatment of the freshly harvested, ovulated eggs in an aqueous solution with addition of at least one signal transduction molecule also naturally occurring in the egg cell for physiological stabilization of the egg membrane by ovoperoxidase activation and subsequent preservation.

The ovulated eggs processed according to the method according to an embodiment of the present invention have a hardened extracellular external skin having cross-linked protein strands and irreversibly incorporated tyrosine molecules. A molecular structure of this type does not occur naturally on unfertilized eggs. An artificially produced product of this type has not existed in the prior art until now.

The ovulated eggs, i.e., the eggs fully mature for fertilization (spawn), can be harvested from the resting aquatic animals, predominantly sturgeon, by natural discharge of the ovulated eggs from the bodily opening and simple stripping. The stress load for the animals is thus minimized and hardly strains them. The freshly harvested, ovulated eggs are exogenously treated before the preservation using a signal transduction molecule also naturally occurring in the egg cell. The enzyme ovoperoxidase is thus activated, which initiates formation and hardening of an extracellular external skin and thus a physiological stabilization of the egg membrane. Therefore, the title "OVOHARD" may be used as a memorable name for the hardening method according to the present invention. A harmless treatment possibility, which is unobjectionable in food law, for hardening the eggs has been found through the treatment of the ovulated eggs using at least one molecule also naturally occurring in the egg cell, which is otherwise formed only in low concentrations in the normal cell metabolism. An artificially initiated later hardening of the eggs obtained is caused by using the method according to an embodiment of the present invention by simple application of a natural substance, which makes the ovulated eggs significantly less sensitive to further treatment, above all during the preservation and decanting, but also during storage and repackaging. An advantage of this artificial later hardening is better storability and thus marketing of the eggs obtained, because the occurrence of tyrosine crystals during storage is avoided. Due to the activation of ovoperoxidase, cross-linking of protein strands and the irreversible incorporation of tyrosine in an impenetrable membrane occur and thus crystal formation is avoided. Furthermore, the treatment has a bactericidal effect, by which the storability of the product is significantly lengthened.

A method according to an embodiment of the present invention comprises an external treatment of the freshly harvested ovulated eggs using at least one molecule also naturally occurring in the egg cell, which plays a key role in the signal transduction chain, which initiates the hardening of the membrane upon a natural fertilization. This particularly relates to calcium ions ($Ca^{++}$), which flow in a wave through the egg after an exogenous stimulation and result in enzyme activation. In addition, at least one further key molecule exists. This is the molecule formed by the oxidase dependent on NADPH, hydrogen peroxide $H_2O_2$. Hydrogen peroxide initiates the natural, endogenously caused formation of a solid fertilization membrane around the egg in extremely small micromolar concentrations. Calcium ions ($Ca^{++}$) exist in the unfertilized egg cell in so-called calcium stores, the mitochondria and the endoplasmic reticulum, but may also enter the cell by flowing in from the outside via specific receptors. Enzymes are released from the internal cellular stores, in which they are stored in inactive form, by this calcium wave. These enzymes (e.g., glucose-6-phosphate-dehydrogenase) in turn produce NADPH. NADPH refers to the phosphorylated form of NADH, significant in anabolism, which results from NAD (nicotinamide-adenine-dinucleotide) by addition of a hydride ion. NADPH-oxidase produces hydrogen peroxide, which is in turn the substrate for ovoperoxidase, which is responsible for the hardening of the egg membrane In nature, the unfertilized, ovulated egg is in a dormant state before it is bombarded by multiple sperm during the natural fertilization. All sperm except for the one which fuses with the egg must be held back. During the natural fertilization, the egg membrane is hardened seconds after the penetration of the sperm to prevent a multiple fertilization by multiple sperm (polyspermy, with the exception of low multiple fertilization, which results in single-egg multiple births), which is fatal for the embryo. The resulting embryo performs this task by forming an extracellular external skin within seconds, which is impenetrable to further sperm. In addition, the embryo is protected from mechanical damage and toxins. The key enzyme for this procedure is ovoperoxidase, which is ready in granula (cortical granules) under the egg membrane in a waiting position. At the moment of fertilization, the reaction sequence described above is set into gear. Due to the produced ovoperoxidase, protein strands cross-link by tyrosine kinase, which stimulates the procedure, tyrosine is irreversibly incorporated in an impenetrable extracellular membrane, which protects the embryo. This mechanism is distributed in the entire animal kingdom of invertebrates such as sea urchins and vertebrates such as fish, mice, and humans for protecting the embryos (La Fleur et al.: "Searching ovoperoxidase: oocyte specific member of a heme dependent peroxidase superfamily that functions to stop polyspermy", Mechanisms of Developments 70 (1998), pp. 77-89 and Wessel et al.: "The Biology of Cortical Granules" Int. Rev. Cytol. 209 (2001), pp. 117-206).

In "Conformational Control of Ovoperoxidase Catalysis in the Sea Urchin fertilization Membrane" by T. L. Deits et al. (Journal of Biological Chemistry, Vol. 261, No. 26, Issue of September 15, pp. 12159-12165, 1966) and "Release of ovoperoxidase from sea urchin eggs hardens the fertilization membrane with tyrosine crosslinks" by Ch. A. Foerder et al. (Proc. Natl. Acad. Sci. Vol. 74, No. 11, pp. 4214-4218, October 1977, Biochemistry) it was fundamentally established for the first time using chromatographic methods that and how cross-linking of tyrosine and hardening of the membrane occur. Furthermore, analysis showed that tyrosine (residue) plays an important role in the hardening process. It was found through specific inhibitors of oxidases that the (ovo) peroxidase apparently plays an important biological role in the tyrosine cross-linking and thus in the hardening of the membrane.

On the basis of the cell biology phenomenon described above, in an embodiment of the method according to the present invention, the exogenous application of at least one signal transduction molecule also naturally occurring in the egg cell for hardening the egg membrane without the use of sperm was developed. The signal transduction molecules may preferably be the oxyradical hydrogen peroxide $H_2O_2$ or a calcium chloride solution $CaCl_2$ for providing calcium ions. A joint use of both signal transduction molecules is possible, because it most closely simulates the natural procedure of the hardening of the egg membrane, and in this way individual product design is possible, in particular in regard to the degree of hardness of the treated eggs, depending on the marketing strategy. The exogenous application and penetration of the artificially supplied signal transduction molecules into the unfertilized, ovulated egg according to the present invention simulates the signal transduction cascade of natural fertilization, and a solid extracellular external skin of the unfertilized ovulated egg forms.

The uniform hardening of all eggs achieved by the method according to the present invention increases with the duration of the treatment from 1 minute to 20 minutes. The degree of hardness may thus be adjusted individually via the treatment duration. In contrast, the supplied concentration of the signal transduction molecules, also naturally occurring in the egg cell, displays the strongest effect on the degree of hardening at lower concentrations, (cf. FIG. 5C for $H_2O_2$). This is plausible, because the natural concentrations of the signal transduction molecules in the cell also act in the nanomolar and micromolar range. The treatment of the freshly harvested eggs using the method according to the present invention may be performed especially advantageously in a water bath using a 0.01%-0.02% addition of hydrogen peroxide and/or calcium ions in the form of calcium chloride $CaCl_2$ for five minutes. Both signal transduction molecules may be used individually, or also in combination.

After the harvesting, the unfertilized ovulated eggs to be processed may first be washed in physiological saline solution before contact with water, to prevent premature sticking and lengthen the processability time of the fresh eggs. The washing step can occur under sterile conditions. The sterile washed eggs are then simply poured into a corresponding bath having the specific concentrations of hydrogen peroxide and/or calcium chloride determined in the method development and screened out after expiration of the acting time. The present invention thus can relate to a very simple, rapid, and still cost-effective method. The low concentration of the chemicals used is also advantageous here, which only require the absolute smallest necessary quantity, which in turn also has a positive effect on the taste of the treated ovulated eggs. Hydrogen-peroxide decomposes into water and oxygen and is therefore tasteless. Calcium, is present in all animal and plant cells and only tastes somewhat chalky at very high concentrations; which are not used in the present invention, however.

The method according to an embodiment of the present invention may be used on the unfertilized, ovulated eggs (spawn) of the particular aquatic animal. Harvesting from a living aquatic animal is preferred, of course, so as not to endanger its species. However, extraction from the killed or dead aquatic animal is also possible. The advantage in this case is that the eggs from wild capture or also from aquaculture, even if they have progressed in maturity to the ovulation stage, may still be processed. Currently, the roe which is already in the stage of ovulation is disposed of unused in the processing industry, which results in a significant economic loss. On one hand, the spawn from aquatic animals killed for other reasons (such as consumption) may be used, on the other hand, aquatic animals no longer have to be killed for nothing if it proves that they are eggs are already in the ovulation stage (until now, these eggs were disposed of unused as unusable). The method according to an embodiment of the present invention also may prevent, through the cross-linked, stable intercalation of tyrosine in the solidified egg membrane, its crystallization out during storage, by which significant product improvement and frequently even product rescue is achieved. Furthermore, the method according to the present invention has bactericidal, antiseptic properties, by which the storability of the ovulated eggs per se and the delicacy foods produced therefrom improve significantly.

However, another advantage of the method according to an embodiment of the present invention is that it is possible for the first time to process the ripened ovulated eggs of fish and other aquatic animals as caviar in the ovulation stage. The eggs are collected by stripping, but they may also be obtained mechanically or using a pump device, so that the female animals remain alive. In addition to preserving the stocks of endangered species, an advantage also exists in preserving females capable of reproduction, by which a significant economic advantage is achieved for aquaculture. Upon lengthening of the propagation stage multiple times, the amount of roe obtained and the reproductive success (rate of viable embryos) increase significantly.

The method according to an embodiment of the present invention may be applied easily and without problems to any type of egg of animals living in and on the water and may thus also contribute to preserving rare animal species. Of course, it provides a special economic advantage in the production of caviar from sturgeon eggs and in the production of corail from lobster eggs. In addition, reliable preservation of the eggs, for example, using sodium chloride or borax, is made possible by the hardening of the harvested ovulated eggs performed by application of the method according to the present invention. It is also possible to smoke the eggs without problems. Bursting of the eggs may no longer have to be dealt with, which significantly increases the product quality. Furthermore, caviar may be produced in various degrees of hardness by the variations of the treatment times/concentrations and in combination with salt and/or borax and thus be tailored to the organoleptic taste requirements of the particular circle of customers.

The ovulated eggs obtained are significantly changed in regard to the morphology of the hardened egg membrane by the application of the method according to the present invention. In particular, a hardened extracellular external skin having cross-linked protein strands and irreversibly incorporated tyrosine molecules may be identified easily and clearly by one skilled in the art with the aid of light microscopy and, in detail, using electron microscopy. This appearance does not occur in natural, conventionally treated eggs of aquatic animals. A hardened egg cell may always only occur in connection with completed fertilization and thus with the presence of at least one sperm in the fertilized egg cell. The application of the method according to an embodiment of the present invention may thus be detected unequivocally on the finished, unfertilized product.

Figure 1:
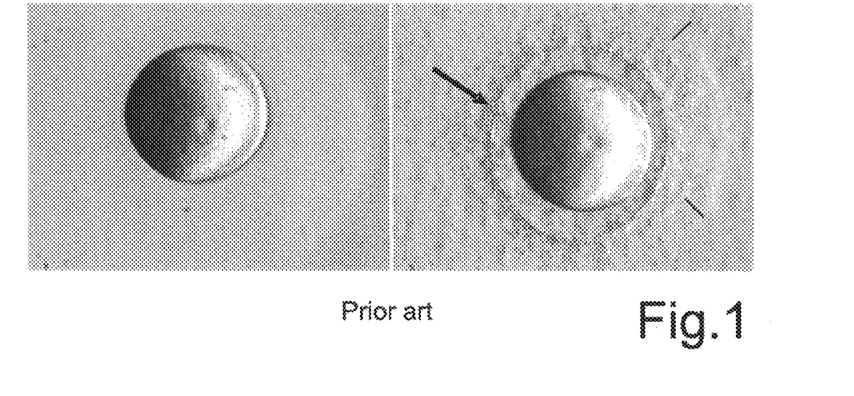
FIG. 1: shows the natural hardening procedure on sea urchin eggs.

FIG. 1 shows the natural fertilization of sea urchin eggs and the formation of an extracellular fertilization membrane. The left image shows the unfertilized egg in 200× enlargement. The right image shows the fertilized egg in identical enlargement having the hardened fertilization membrane (arrow). The small dashes show the attacking sperm.

The method according to an embodiment of the present invention was tested on the living eggs of sea urchins (*Psammechinus miliaris*) and on the eggs of the Siberian sturgeon (*Acipenser baerii*). The results of the hardening of ovulated eggs were monitored in vivo on the basis of measurements of the enzyme activities and morphology of sea urchin eggs and sturgeon eggs As previously stated, the activation of the enzyme glucose-6-phosphate dehydrogenase, which occurs in seconds, to produce the reduction equivalent NADPH for $H_2O_2$ production as the substrate for ovoperoxidase is the initial trigger for egg hardening of the egg membrane. The rise of G6PDH activity may be measured in the living eggs under the influence of the exogenous stimulus. The tetrazolium salt method according to Van Noorden and Fredericks (1992) was transferred to living cells as evidence. The NADPH arising upon the substrate reaction reduces tetrazolium salt (TNBT) quantitatively to form a brown reaction product, formazan. The formation of the reaction product is detected in time with the aid of absorption measurements at a wavelength of 585 nm.

Figure 2:
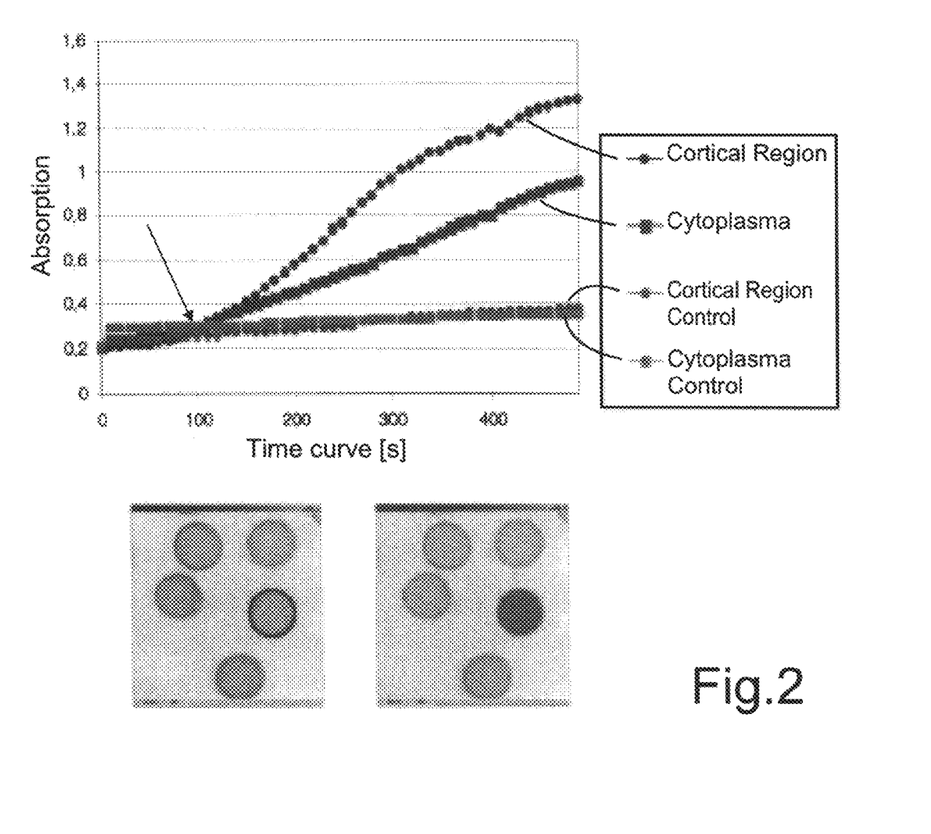
FIG. 2: shows the analysis of time-lapse microscopy of the NADPH production upon application of the method according to the present invention.

FIG. 2 shows time-lapse microscopy (imaging using Zeiss Axiovert, Axiocam, KS300 Software, Axiovsion Software) of NADPH production in living sea urchin eggs. The arrow shows the application of the exogenous stimulus ($H_2O_2$ 1% in sea water). The two upper absorption curves in the cortical region (egg boundary) and in the cytoplasm (egg interior) show a significant rise over the time in seconds after the application. A control was performed without exogenous stimulus. The two lower absorption curves for the cortical region and the cytoplasm show no change after the application. The measuring masks (measuring macro) for the microscopy are shown in the two lower images in FIG. 2. The left image shows the ring-shaped measuring mask for the cortical region, the right image shows the circular measuring mask for the cytoplasm. The enzyme activity is highest in the cortical region below the egg membrane, because the highest NADPH demand for the $H_2O_2$ consumption exists here. An identical curve of the enzyme activation was observed for ovoperoxidase after $H_2O_2$ application.

Figure 3A:
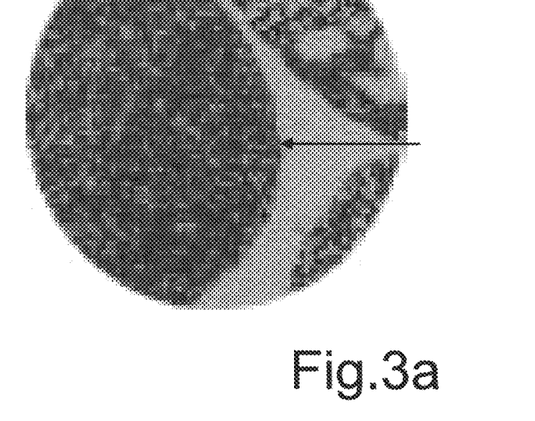
FIG. 3a: shows an untreated ovulated egg of the sea urchin.
Figure 3B:
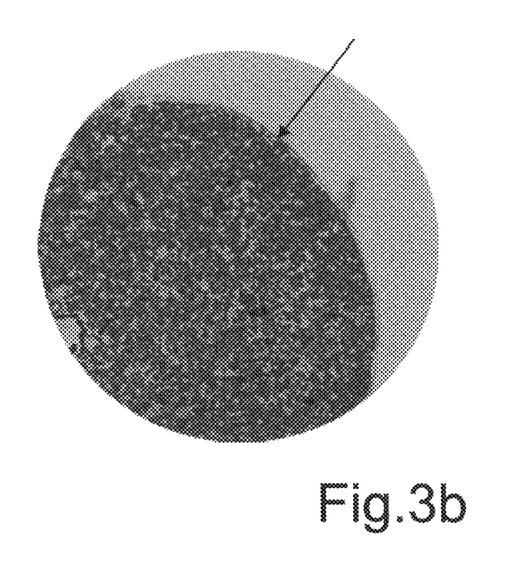
FIG. 3b: shows a treated ovulated egg of the sea urchin.

FIG. 3a shows an untreated ovulated egg of the sea urchin without protective membrane (enlargement 400×). The cortical granula lie loosely distributed on the egg surface and are only covered by a thin vitelline layer, which is not recognizable in light microscopy. FIG. 3b shows an egg treated using the method according to an embodiment of the present invention having a clearly formed protective membrane (arrow, enlargement 400×). The detection is performed by histological assays of thin sections of fixed egg material (4% Bakers formaldehyde, embedding in Epon for TEM, staining using toluidine blue) before and after the treatment using an exogenous hardening agent according to the present invention.

Extensive experiments on harvested eggs of the sturgeon (*Acipenser baerii*) showed that the method developed on sea urchin eggs may be transferred directly and provides the desired result. The preservation using cooking salt and borax performed after the hardening of the eggs and also the shelf life experiments over 12 months showed that the eggs remain stable.

Figure 4:
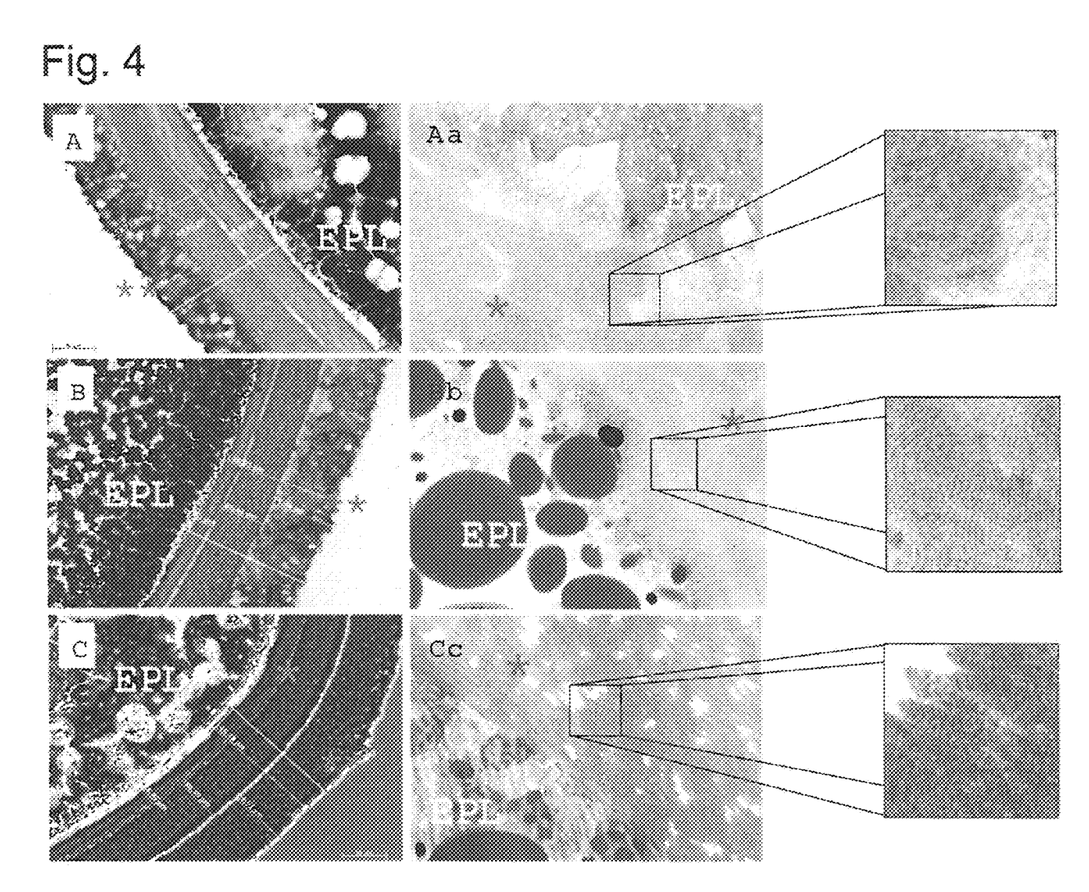
FIG. 4a: shows pictures of ultrathin sections through the egg membrane of an untreated ovulated sturgeon egg.
FIG. 4b: shows pictures of ultrathin sections through the egg membrane of an untreated ovulated sturgeon egg after a treatment using calcium chloride.
FIG. 4c: shows pictures of ultrathin sections through the egg membrane of an untreated ovulated sturgeon egg after a treatment using hydrogen peroxide, FIGS. 5a,b: show diagrams of the measurements of the proportions of the membrane components in the total thickness of the membrane in % of immature sturgeon eggs (caviar) treated according to the present invention, and FIGS. 5c,d: show diagrams of the measurements of the proportions of the membrane components in the total thickness of the membrane in % of ovulated sturgeon eggs treated according to the present invention.

FIGS. 4A through C show light microscopy pictures of cryostat sections stained by H&E, electron microscope pictures of ultrathin sections of eggs of the sturgeon fixed by GA and osmium and embedded in Epon. The pictures show the membrane changes of ovulated eggs of the sturgeon by a treatment according to the present invention.

FIG. 4A shows a light microscopy picture of a section through an ovulated sturgeon egg without treatment according to the present invention. The envelope (solid line) enclosing the egg plasma (EPL) of sturgeon eggs comprises multiple layers of membrane. The innermost membrane is identified by one star (*), the outermost membrane (fertilization membrane) is identified by three stars (***). FIG. 4Aa shows an electron microscope pictures in 3000× enlargement in the area of the innermost membrane (*) and a detail therefrom in 12,000× enlargement having loose tyrosine fiber bundles.

FIG. 4B shows an ovulated sturgeon egg treated using 115 mg/l calcium chloride according to the present invention. FIG. 4Bb shows an electron microscope picture in 3000× enlargement and a detail in 12,000× enlargement having a compaction by tyrosine cross-linking. FIG. 4C shows an ovulated sturgeon egg treated using 0.01% hydrogen peroxide. FIG. 4Cc shows an electron microscope recording in 3000× enlargement and a detail in 12,000× enlargement having a compaction into strands by tyrosine cross-linking.

It may be seen from the comparison of FIGS. 4A (untreated), 4B (treated using calcium chloride), 4C (treated using hydrogen peroxide) that through the treatment according to the present invention, the innermost membrane (*) of ovulated sturgeon eggs decreases in diameter and compacts by tyrosine cross-linking, while the outermost membrane (***) increases in diameter, but also becomes denser. The compaction results in the desired hardening of the egg membrane. The degree of hardening may be adjusted by metering the exogenous additives in regard to type, quantity, and duration.

Figure 5A:
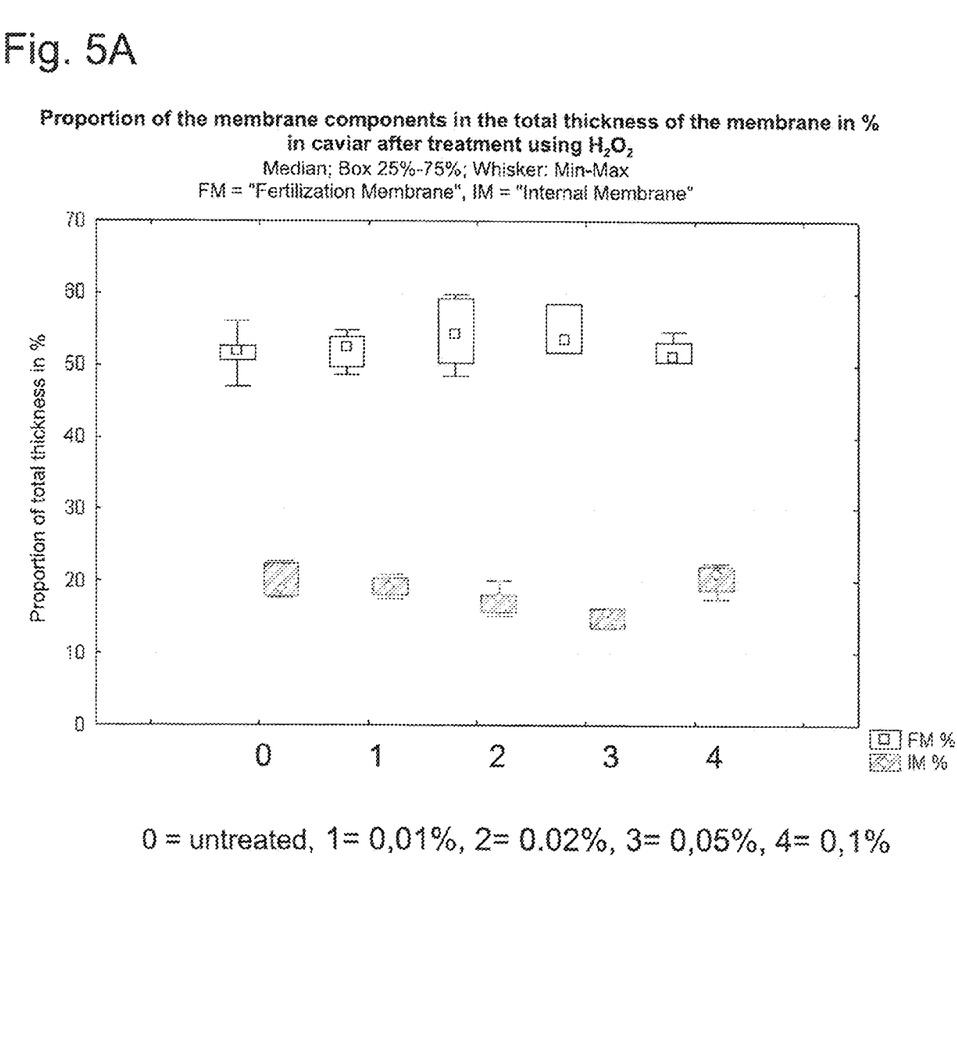
Figure 5B:
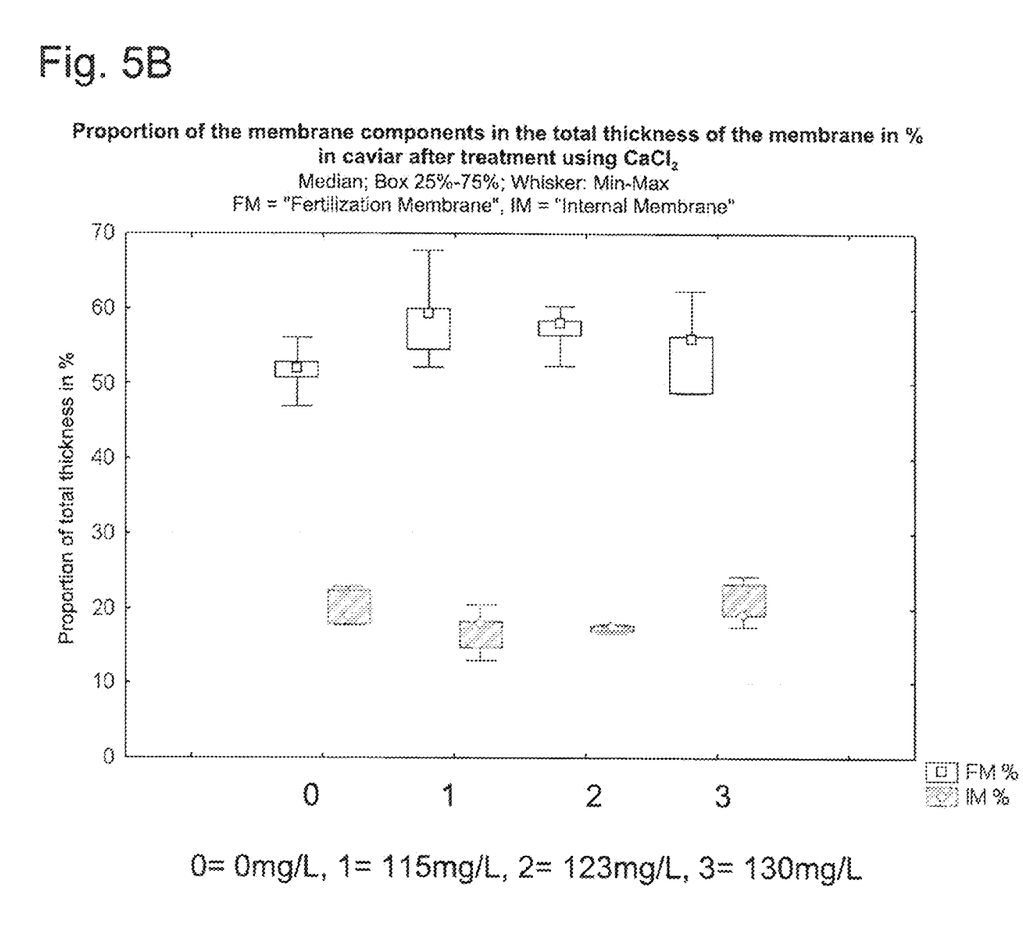
Figure 5C:
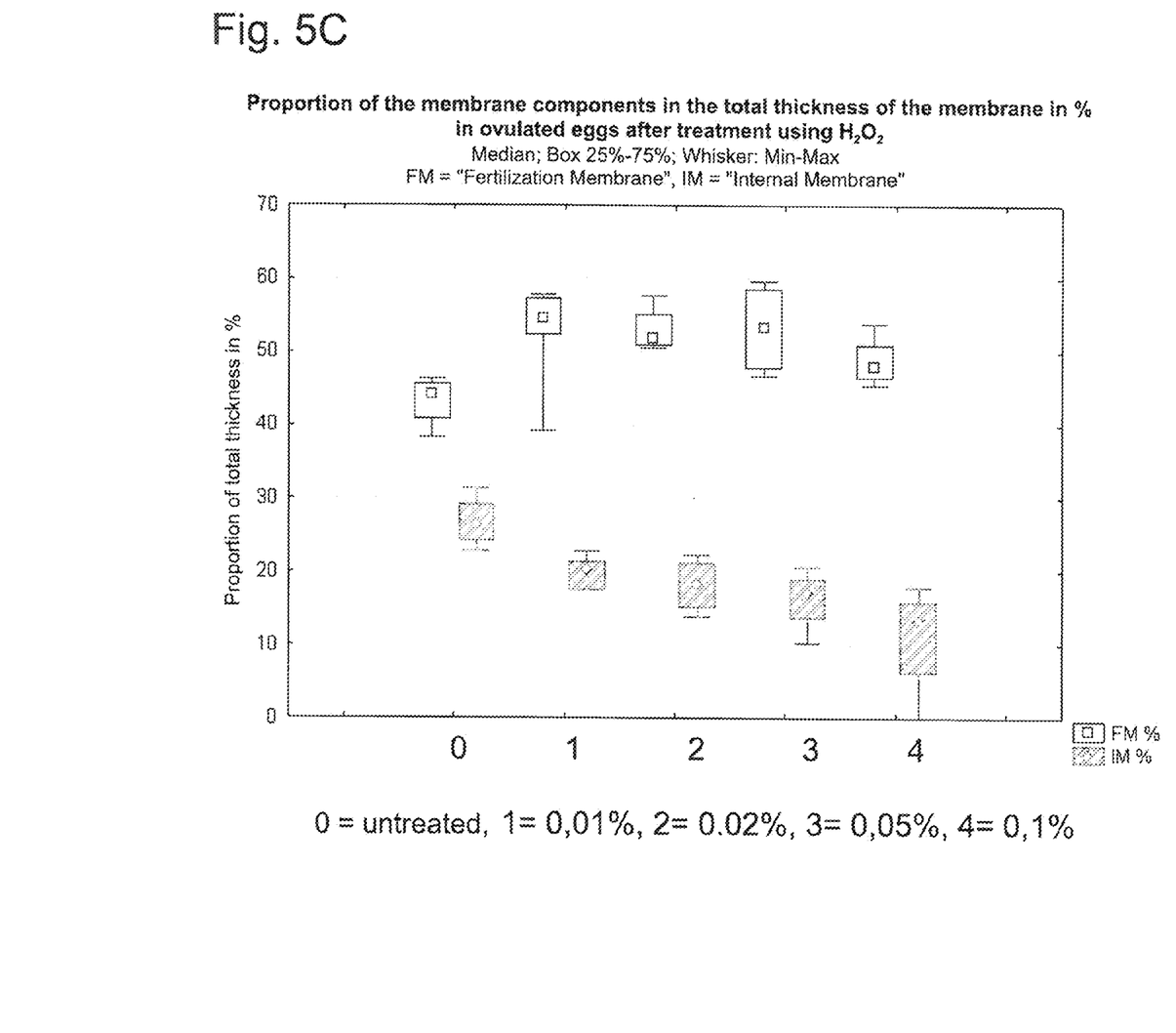
Figure 5D:
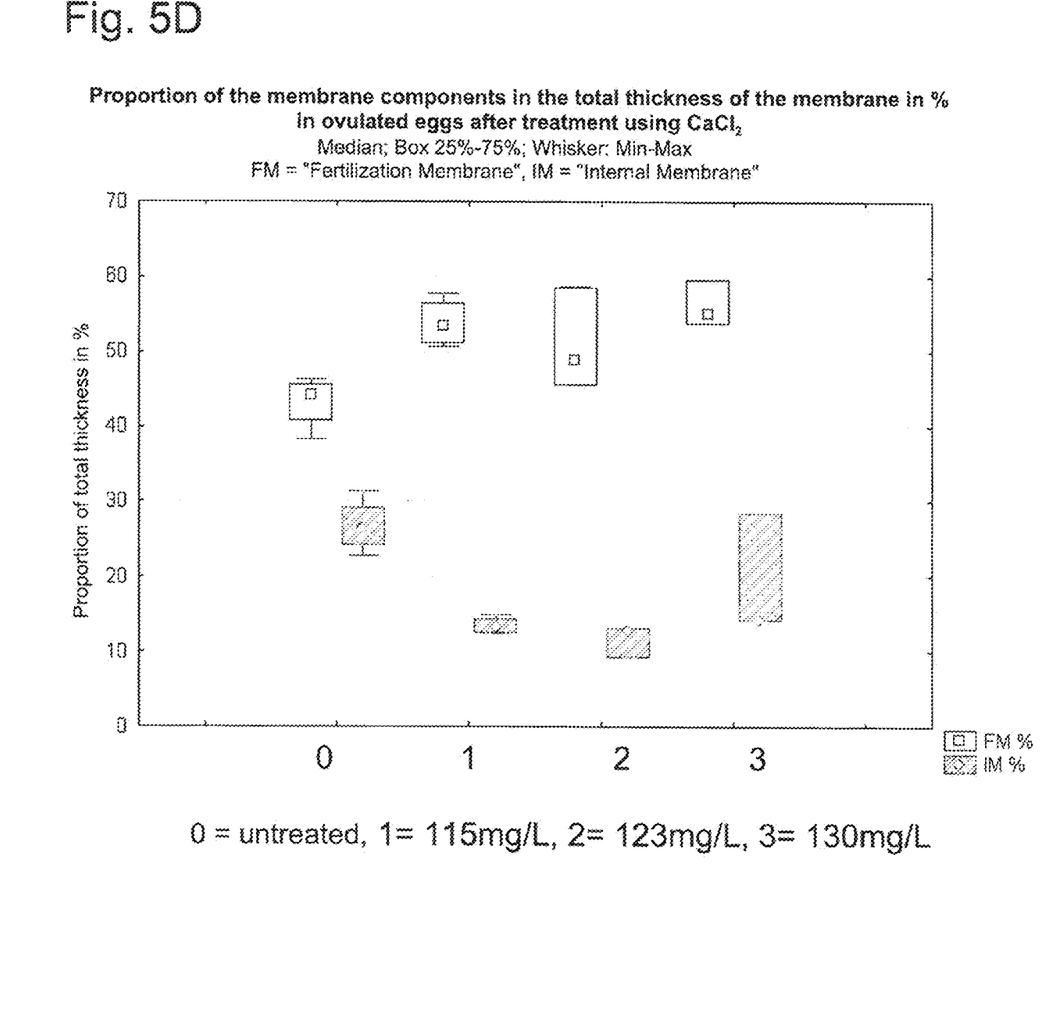

FIGS. 5A . . . D show various diagrams of the measurements of the proportions of the membrane components in the total thickness of the membrane in % on currently commercially available caviar from immature eggs (FIGS. 5A, 5B) and on ovulated eggs (FIGS. 5C, 5D) after the treatment according to the present invention using hydrogen peroxide or calcium chloride. FIGS. 5A and 5C show a treatment using hydrogen peroxide $H_2O_2$ (treatment 0: untreated, treatment 1: 0.01% solution, treatment 2: 0.02% solution, treatment 3: 0.05% solution, treatment 4: 0.1% solution), FIGS. 5B and 5D show a treatment using calcium chloride $CaCl_2$ (treatment 0: untreated, treatment 1: 115 mg/l, treatment 2: 123 mg/l, treatment 3:130 mg/l with 1=per liter of solution). This means that the metering of the calcium ions in the micromolar range is to contain significantly more calcium ions than in normal drinking and spring water. The fertilization membrane is identified by "FM", which, without fertilization, only results through treatment according to the present invention, the internal membrane is identified by "IM".

It may be seen that upon a treatment of currently commercially available caviar, i.e., of immature eggs, according to FIGS. 5A and 5B no relevant changes result in the membrane thickness, while the shift of the thickness proportions of internal membrane to the produced fertilization membrane causing hardening upon the treatment of ovulated eggs according to the present invention according to FIGS. 5C and 5D is significant. The medians of 50 measurements each of the internal membrane (IM) and the external fertilization membrane (FM) are shown with the value distribution in the confidence interval of the 25%-75% quarters and the minimum and maximum values.

The invention claimed is:
1. A method for processing ovulated eggs of an aquatic animal into delicacy foods, the method comprising:
harvesting the ovulated eggs without harmful intervention of the aquatic animal;

exogenously treating the harvested ovulated eggs in an aqueous solution by adding at least one signal transdudtion molecule so as to physiologically stabilize a membrane of the egg by ovoperoxidase activation, the signal transduction molecule being naturally occurring in the egg cell; and then preserving the eggs.

2. The method as recited in claim 1 wherein the at least one signal transduction molecule comprises hydrogen peroxide.

3. The method as recited in claim 1 wherein the at least one signal transduction molecule comprises calcium chloride.

4. The method as recited in claim 2 wherein the at least one signal transduction molecule comprises calcium chloride.

5. The method as recited in claim 2 wherein the exogenous treating is carried out in a water bath; and wherein the at least one signal transduction molecule comprises at least one of 0.01, 0.02, 0.05 and 0.1% hydrogen peroxide.

6. The method as recited in claim 2 wherein the exogenous treating is carried out in a water bath, wherein the signal transduction molecule comprises 0.01% hydrogen peroxide, and wherein a treatment time of the exogenous treating is between 1 and 5 minutes, and further comprising setting the treatment time as a function of a desired hardness of the treated ovulated eggs.

7. The method as recited in claim 3 wherein the exogenous treating is carried out in a water bath, wherein the signal transduction molecule comprises 0.01% hydrogen peroxide, and wherein a treatment time of the exogenous treating is between 1 and 5 minutes, and further comprising setting the treatment time as a function of a desired hardness of the treated ovulated eggs.

8. The method as recited in claim 3 wherein the exogenous treating is carried out in a water bath and wherein the signal transduction molecule comprises at least one of 115 mg/l, 123 mg/l and 130 mg/l of calcium chloride.

9. The method as recited in claim 8 wherein the exogenous treating is carried out in a water bath, wherein the signal transduction molecule comprises 115 mg/l calcium chloride, and wherein a treatment time of the exogenous treatment is between 10 and 20 minutes, and further comprising setting the treatment time as a function of desired hardness of the treated ovulated eggs.

10. The method as recited in claim 3 wherein the exogenous treating is carried out in a water bath, wherein the signal transduction molecule comprises 115 mg/l calcium chloride, and wherein a treatment time of the exogenous treatment is between 10 and 20 minutes, and further comprising setting the treatment time as a function of desired hardness of the treated ovulated eggs.

11. The method as recited in claim 2 wherein the exogenous treating is carried out in a water bath, and wherein the signal transduction molecule comprises at least one of a 115 mg/l, a 123 mg/l and a 130 mg/l of calcium chloride.

12. The method as recited in claim 4 wherein the exogenous treating is carried out in a water bath, wherein the signal transduction molecule comprises 115 mg/l calcium chloride, and wherein a treatment time of the exogenous treatment is between 10 and 20 minutes, and further comprising setting the treatment time as a function of desired hardness of the treated ovulated eggs.

13. The method as recited in claim 4 wherein the exogenous treating is carried out in a water bath, and wherein the signal transduction molecule comprises hydrogen peroxide and calcium chloride, and wherein a treatment time of the exogenous treatment is between 1 and 20 minutes, and further comprising setting the treatment time as a function of desired hardness of the treated ovulated eggs.

14. The method as recited in claim 1 further comprising washing the ovulated eggs in physiological saline solution under sterile conditions before the exogenous treatment.

15. The method as recited in claim 2 further comprising washing the ovulated eggs in physiological saline solution under sterile conditions before the exogenous treatment.

16. The method as recited in claim 3 further comprising washing the ovulated eggs in physiological saline solution under sterile conditions before the exogenous treatment.

17. The method as recited in claim 4 further comprising washing the ovulated eggs in physiological saline solution under sterile conditions before the exogenous treatment.

18. The method as recited in claim 1 wherein the ovulated eggs are harvested from living aquatic animals.

19. The method as recited in claim 1 wherein the ovulated eggs are harvested from at least one of animal fish and crustaceans.

20. The method as recited in claim 1 wherein the ovulated eggs are harvested from sturgeon.

21. Ovulated eggs of an aquatic animal processed into delicacy foods using a method comprising:

harvesting the ovulated eggs without harmful intervention of the aquatic animal;

exogenously treating the harvested ovulated eggs in an aqueous solution by adding at least one signal transduction molecule so as to physiologically stabilize a membrane of the egg by ovoperoxidase activation, the signal transduction molecule being naturally occurring in the egg cell; and then preserving the eggs.

* * * * *